United States Patent
Tang et al.

(10) Patent No.: US 11,120,078 B2
(45) Date of Patent: Sep. 14, 2021

(54) METHOD AND DEVICE FOR VIDEO PROCESSING, ELECTRONIC DEVICE, AND STORAGE MEDIUM

(71) Applicant: BEIJING SENSETIME TECHNOLOGY DEVELOPMENT CO., LTD., Beijing (CN)

(72) Inventors: Xiaoou Tang, Beijing (CN); Dian Shao, Beijing (CN); Yu Xiong, Beijing (CN); Yue Zhao, Beijing (CN); Qingqiu Huang, Beijing (CN); Yu Qiao, Beijing (CN); Dahua Lin, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/975,347

(22) PCT Filed: Aug. 6, 2019

(86) PCT No.: PCT/CN2019/099486
§ 371 (c)(1),
(2) Date: Aug. 24, 2020

(87) PCT Pub. No.: WO2020/029966
PCT Pub. Date: Feb. 13, 2020

(65) Prior Publication Data
US 2020/0394216 A1  Dec. 17, 2020

(30) Foreign Application Priority Data
Aug. 7, 2018  (CN) .......................... 201810892997.4

(51) Int. Cl.
*G06F 16/78*  (2019.01)
*G06F 16/783*  (2019.01)
(Continued)

(52) U.S. Cl.
CPC .......... *G06F 16/7844* (2019.01); *G06F 16/73* (2019.01); *G06F 16/743* (2019.01);
(Continued)

(58) Field of Classification Search
CPC . G06F 16/7844; G06F 40/20; G06K 9/00744; H04N 21/232
See application file for complete search history.

(56) References Cited

U.S. PATENT DOCUMENTS

| 2011/0047163 A1 | 2/2011 | Chechik |
| 2012/0131060 A1 | 5/2012 | Heidasch |

(Continued)

FOREIGN PATENT DOCUMENTS

| CN | 101894170 A | 11/2010 |
| CN | 102750366 A | 10/2012 |

(Continued)

OTHER PUBLICATIONS

Dian Shao et al. Find and Focus: Retrieve and Localize Video Events with Natural Language Queries, 2018, 4 pages.
(Continued)

*Primary Examiner* — Girumsew Wendmagegn
(74) *Attorney, Agent, or Firm* — Cooper Legal Group, LLC (57) ABSTRACT

The present disclosure relates to a method and device for video processing, an electronic device, and a storage medium. The method comprises: determining, on the basis of paragraph information of a query text paragraph and video information of multiple videos in a video library, preselected videos associated with the query text paragraph in the multiple videos; and determining a target video in the preselected videos on the basis of video frame information of the preselected videos and of sentence information of the query text paragraph. The method for video processing of
(Continued)

Determine preselected videos associated with a query text paragraph in a plurality of videos according to paragraph information of the query text paragraph and video information of the plurality of videos in a video library — S11

Determine a target video in the preselected videos according to video frame information of the preselected videos and sentence information of the query text paragraph — S12 the embodiments of the present disclosure indexes videos by means of the relevance between the videos and the query text paragraph, allows the pinpointing of the target video, avoids search result redundancy, allows the processing of the query text paragraph in a natural language form, and is not limited by the inherent contents of content labels.

20 Claims, 4 Drawing Sheets

(51) Int. Cl.
*G06F 16/74* (2019.01)
*G06F 16/73* (2019.01)
*G06F 40/20* (2020.01)
*G06K 9/00* (2006.01)
*G06K 9/62* (2006.01)
*H04N 21/232* (2011.01)
*H04N 21/234* (2011.01)
*H04N 21/432* (2011.01)
*H04N 21/44* (2011.01)

(52) U.S. Cl.
CPC ......... *G06F 40/20* (2020.01); *G06K 9/00744* (2013.01); *G06K 9/6215* (2013.01); *H04N 21/232* (2013.01); *H04N 21/23418* (2013.01); *H04N 21/432* (2013.01); *H04N 21/44008* (2013.01)

(56) References Cited

U.S. PATENT DOCUMENTS

| | | |
|---|---|---|
| 2015/0339380 A1 | 11/2015 | Zhang et al. |
| 2017/0150235 A1 | 5/2017 | Mei et al. |
| 2017/0357720 A1 | 12/2017 | Torabi et al. |
| 2018/0052851 A1* | 2/2018 | Lewis ............... G06F 16/24578 |
| 2019/0311743 A1* | 10/2019 | Shen ..................... G06F 16/739 |

FOREIGN PATENT DOCUMENTS

| | | |
|---|---|---|
| CN | 103593363 A | 2/2014 |
| CN | 104239501 A | 12/2014 |
| CN | 104798068 A | 7/2015 |
| CN | 106156204 A | 11/2016 |
| CN | 108304506 A | 7/2018 |
| CN | 109089133 A | 12/2018 |

OTHER PUBLICATIONS

Liu. Yao et al., Research on Key Technologies and Application of Intelligent Search Engine, Library and Information Service, vol. 59, No. 5, Mar. 31, 2015 (Mar. 31, 2015), entire document, 7 pages.
International Search Report and the English Translation of the International Search Report in the international application No. PCT/CN2019/099486, dated Oct. 30, 2019, 7 pages.
Written Opinion and its English translation of the International Search Authority in the international application No. PCT/CN2019/099486, dated Oct. 30, 2019, 8 pages.
First Office Action and the English Translation of the First Office Action of the Chinese application No. 201810392997.4, dated Oct. 25, 2019, 17 pages.

* cited by examiner

METHOD AND DEVICE FOR VIDEO PROCESSING, ELECTRONIC DEVICE, AND STORAGE MEDIUM

The present disclosure claims priority to Chinese Patent Application No. 201810892997.4, filed with the Chinese Patent Office on Aug. 7, 2018, and entitled "METHOD AND DEVICE FOR VIDEO PROCESSING. ELECTRONIC DEVICE, AND STORAGE MEDIUM", which is incorporated herein by reference in its entirety.

TECHNICAL FIELD

The present disclosure relates to the field of computer technologies, and in particular, to a method and device for video processing, an electronic device, and a storage medium.

BACKGROUND

In the related art, in order to query or retrieve a video in a video library with a sentence, typically, a content tag needs to be defined in advance for the video in the video library, and then the video is retrieved through the tag. It is difficult to define content tags for some videos, and the content tag lacks extensibility, so that it is difficult to retrieve content of a video without a tag. In addition, content tags of different videos may be repeated, which may result in redundancy of retrieval results. Therefore, it is difficult to handle retrieval content in the natural language form with the content tag.

SUMMARY

The present application provides a method and device for video processing, an electronic device, and a storage medium.

A method for video processing provided according to one aspect of the present disclosure includes: determining preselected videos associated with a query text paragraph in a plurality of videos according to paragraph information of the query text paragraph and video information of the plurality of videos in a video library; and determining a target video in the preselected videos according to video frame information of the preselected videos and sentence information of the query text paragraph.

According to the method for video processing in embodiments of the present disclosure, preselected videos are determined according to paragraph information of a query text paragraph and video information of videos, and a target video is determined according to sentence information of the query text paragraph and video frame information of the preselected video. Videos are retrieved through correlations between the videos and the query text paragraph, so that the target video can be accurately found and the query result redundancy is avoided; moreover, the query text paragraph in the natural language form may be processed without being limited by the inherent content of a content tag.

A device for video processing provided according to another aspect of the present disclosure includes: a preselected video determining module, configured to determine preselected videos associated with a query text paragraph in a plurality of videos according to paragraph information of the query text paragraph and video information of the plurality of videos in a video library; and a target video determining module, configured to determine a target video in the preselected videos according to video frame information of the preselected videos and sentence information of the query text paragraph.

An electronic device provided according to another aspect of the present disclosure includes: a processor; and a memory configured to store processor-executable instructions, where the processor is configured to perform the foregoing method for video processing.

A computer-readable storage medium provided according to another aspect of the present disclosure has computer program instructions stored thereon, where when the computer program instructions are executed by a processor, the foregoing method for video processing is implemented.

It should be understood that the foregoing general descriptions and the following detailed descriptions are merely exemplary and explanatory, and are not intended to limit the present disclosure.

Exemplary embodiments are described in detail below according to the following reference accompanying drawings, and other features and aspects of the present disclosure become clear.

BRIEF DESCRIPTION OF DRAWINGS

The accompanying drawings herein are incorporated into the description and constitute a part of the description. These accompanying drawings show embodiments that conform to the present disclosure, and are intended to describe the technical solutions in the present disclosure together with the description.

DETAILED DESCRIPTION

The following describes various exemplary embodiments, features, and aspects of the present disclosure in detail with reference to the accompanying drawings. The same reference numerals in the accompanying drawings represent elements with the same or similar functions. Although various aspects of the embodiments are shown in the accompanying drawings, the accompanying drawings are not necessarily drawn in proportion unless otherwise specified.

The special term "exemplary" herein means "used as examples, embodiments, or descriptions". Any embodiment herein described by the term "exemplary" should not be explained as being more superior or better than other embodiments.

The term "and/or" herein only describes an association relation between associated objects, indicating that three relations may exist, for example, A and/or B may indicate three conditions, i.e., A exists separately, A and B exist at the same time, and B exists separately. In addition, the term "at least one" herein indicates any one of multiple elements or any combination of at least two of multiple elements. For example, including at least one of A, B, or C may indicate including any one or more elements selected from a set consisting of A, B, and C.

In addition, for better illustration of the present disclosure, various specific details are given in the following specific implementations. A person skilled in the art should understand that the present disclosure may also be implemented without some of the specific details. In some examples, methods, means, elements, and circuits well known to a person skilled in the art are not described in detail so as to highlight the subject matter of the present disclosure.

Figure 1:
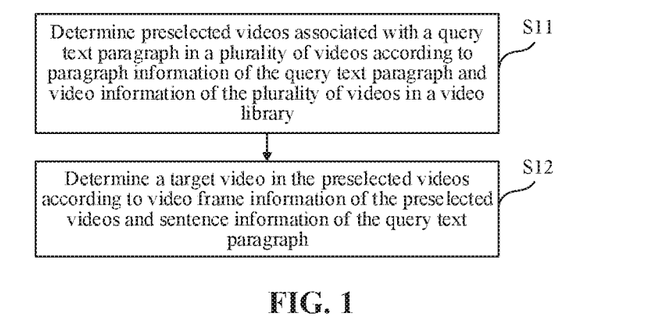
FIG. 1 illustrates a flowchart of a method for video processing according to embodiments of the present disclosure.

FIG. 1 illustrates a flowchart of a method for video processing according to embodiments of the present disclosure. As shown in FIG. 1, the method for video processing includes the following steps.

At step S11, preselected videos associated with a query text paragraph in a plurality of videos is determined according to paragraph information of the query text paragraph and video information of the plurality of videos in a video library.

At step S12, a target video in the preselected videos is determined according to video frame information of the preselected videos and sentence information of the query text paragraph.

According to the method for video processing in the embodiments of the present disclosure, preselected videos are determined according to paragraph information of a query text paragraph and video information of videos, and a target video is determined according to sentence information of the query text paragraph and video frame information of the preselected video. The videos are retrieved through correlations between the videos and the query text paragraph, so that the target video can be accurately found and the query result redundancy is avoided; moreover, the query text paragraph in the natural language form may be processed without being limited by the inherent content of a content tag.

In one possible implementation, the method for video processing may be executed by terminal devices or servers or other processing devices, where the terminal devices may be a User Equipment (UE), a mobile device, a user terminal, a terminal, a cellular phone, a cordless phone, a Personal Digital Assistant (PDA), a handheld device, a computing device, a vehicle-mounted device, a wearable device, etc. In some possible implementations, the method for video processing may be implemented by invoking, by a processor, computer-readable instructions stored in a memory. In order to retrieve or query a video in a database, a query text paragraph may be entered, the query text paragraph including one or more sentences. The video whose content is closest to the content described in the query text paragraph may be queried in the database.

In one possible implementation, the sentence information includes first feature information of one or more sentences of the query text paragraph, the paragraph information includes second feature information of the query text paragraph, the video frame information includes fourth feature information of a plurality of video frames of the videos, and the video information includes third feature information of the videos.

In one possible implementation, the first feature information of the one or more sentences of the query text paragraph is obtained, and the second feature information of the query text paragraph is determined. The first feature information of a sentence may be a feature vector that represents the semantics of the sentence. The method further includes: performing feature extraction processing on the one or more sentences of the query text paragraph respectively to obtain the first feature information of the one or more sentences; and determining the second feature information of the query text paragraph according to the first feature information of the one or more sentences of the query text paragraph.

In one possible implementation, the content of one or more sentences may be subjected to feature extraction by means of semantic recognition and other methods to obtain the first feature information of the one or more sentences. For example, the content of the one or more sentences may be semantically recognized by a neural network to perform feature extraction on the content of the one or more sentences, so as to obtain the first feature information of the one or more sentences. The present disclosure does not limit the method for feature extraction of the content of the one or more sentences.

In one possible implementation, the first feature information may be a feature vector that represents the semantics of the sentence. The first feature information of the one or more sentences in the query text paragraph may be fused to obtain the second feature information of the query text paragraph. The second feature information may be a feature vector that represents the semantics of the query text paragraph. In an example, the first feature information is a feature vector that represents the semantics of the sentence, and the first feature information of the one or more sentences may be summed, averaged, or otherwise processed to obtain the second feature information of the query text paragraph. For example, the query text paragraph includes M sentences, the first feature information of the M sentences is $S_1, S_2, \ldots, S_M$, respectively, and $S_1, S_2, \ldots, S_M$ may be summed, averaged, or otherwise processed to be fused into the second feature information P of the query text paragraph, the second feature information P being a feature vector having the same dimension as $S_1, S_2, \ldots, S_M$. The present disclosure does not limit the method for obtaining the second feature information of the query text paragraph.

In this way, the second feature information of the query text paragraph may be obtained by extracting the first feature information of each sentence in the query text paragraph, and the semantics of the query text paragraph may be accurately represented by the second feature information.

In one possible implementation, fourth feature information of a plurality of video frames of a video may be obtained, and third feature information of the video is obtained according to the fourth feature information. The method further includes: performing feature extraction processing on a plurality of video frames of a second video respectively to obtain fourth feature information of the plurality of video frames of the second video, where the second video is any one of the plurality of videos; and determining third feature information of the second video according to the fourth feature information of the plurality of video frames of the second video.

In one possible implementation, feature extraction processing is performed on the plurality of video frames of the second video respectively to obtain the fourth feature information of the plurality of video frames of the second video. In an example, feature extraction processing is performed on each video frame of the second video, or one video frame may be selected for feature extraction processing every other certain frames. In an example, one video frame is selected for feature extraction processing every other 5 video frames (i.e., every 6 video frames) (i.e., feature information of the selected one of the six video frames is determined as the fourth feature information), or feature information of the six video frames is subjected to fusion processing (e.g., performing summing, averaging, or other processing, i.e., the feature information of the six video frames is fused into one, and the feature information obtained by fusing the feature information of the six video frames is determined as the fourth feature information), or feature information of each video frame of the second video is extracted as the fourth feature information. In an example, the four feature information may be a feature vector that represents the feature information in the video frame. For example, the fourth feature information may represent feature information, such as a character, a clothing color, an action, and a scene, in a video frame, the video frame may be subjected to feature extraction processing through a convolutional neural network. The present disclosure does not limit the method for extracting the feature information in the video frame.

In one possible implementation, the fourth feature information of the plurality of video frames of the second video may be fused, to obtain the third feature information of the second video. In an example, the four feature information is a feature vector that represents the feature information in the video frame. The multiple pieces of feature information are summed, averaged, or otherwise processed to obtain the third feature information of the second video. The third feature information is a feature vector that represents the feature information of the second video. For example, fourth feature information $f_1, f_2, \ldots, f_T$ of T (T is a positive integer) video frames is obtained from the plurality of video frames of the second video, and $f_1, f_2, \ldots, f_T$ may be summed, averaged, or otherwise processed to be fused into third feature information Vi of the second video, where 1≤i≤N, and N is the number of videos in a video library. The present disclosure does not limit the method for obtaining the third feature information.

In one possible implementation, before step S11 is executed, feature extraction may be performed on all videos in the video library in advance to obtain the third feature information and the fourth feature information of the videos in the video library. When a new video is added into the video library, feature extraction may be performed on the new video to obtain the third feature information and the fourth feature information of the new video.

In this way, the third feature information of the second video may be obtained by extracting the fourth feature information of the video frames in the second video, and the feature information of the second video may be accurately represented by the third feature information.

Figure 2:
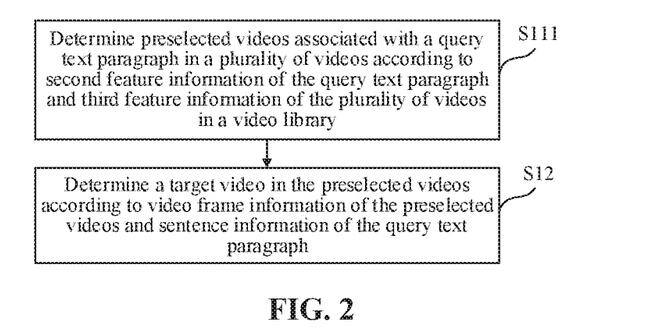
FIG. 2 illustrates a flowchart of a method for video processing according to embodiments of the present disclosure.

FIG. 2 illustrates a flowchart of a method for video processing according to embodiments of the present disclosure. As shown in FIG. 2, step S11 includes the following steps.

At step S111, preselected videos associated with a query text paragraph in a plurality of videos are determined according to second feature information of the query text paragraph and third feature information of the plurality of videos in a video library.

In one possible implementation, determining the preselected videos associated with the query text paragraph in the plurality of videos according to the second feature information and the third feature information of the plurality of videos in the video library may include: determining first correlation scores between the query text paragraph and the plurality of videos respectively according to the second feature information and the third feature information of the plurality of videos in the video library; and determining the preselected videos in the plurality of videos according to the first correlation scores.

In one possible implementation, the second feature information may be a feature vector that represents the semantics of the query text paragraph, the third feature information may be a feature vector that represents feature information of a second video, and the dimensions of the second feature information and the third feature information may be different, i.e., the second feature information and the third feature information may not be in a vector space of the same dimension. Therefore, the second feature information and the third feature information may be processed such that the processed second feature information and third feature information are in a vector space of the same dimension.

In one possible implementation, determining the first correlation scores between the query text paragraph and the plurality of videos respectively according to the second feature information and the third feature information of the plurality of videos in the video library may include: mapping third feature information of a first video and the second feature information to a vector space of the same dimension, to obtain a third feature vector of the first video and a second feature vector of the query text paragraph, where the first video is any one of the plurality of videos; and determining a cosine similarity between the second feature vector and the third feature vector as a first correlation score between the query text paragraph and the first video.

In this way, the cosine similarity between the second feature vector and the third feature vector is determined as a first correlation score between the query text paragraph and the first video, and the correlation between the semantic content of the query text paragraph and the feature information of the first video may be accurately determined.

In one possible implementation, the third feature information of the first video and the second feature information may be mapped to a vector space of the same dimension by means of mapping. In an example, the third feature information of the first video is a feature vector $V_j$, where 1≤j≤N, and the second feature information of the query text paragraph is a feature vector P. The dimensions of P and $V_j$ are different. P and $V_j$ may be mapped to a vector space of the same dimension by means of mapping, so as to obtain a third feature vector $\tilde{V}_j$ of the first video and a second feature vector $\tilde{P}$ of the query text paragraph.

In one possible implementation, the third feature information and the second feature information may be mapped to a vector space of the same dimension using a neural network. In an example, mapping the third feature information of the first video and the second feature information to the vector space of the same dimension, to obtain the third feature vector of the first video and the second feature vector of the query text paragraph may include: mapping the third feature information as the third feature vector using a first neural network, and mapping the second feature information as the second feature vector using a second neural network.

In an example, the first neural network and the second neural network may be a back propagation (BP) neural network, a convolutional neural network, or a recurrent neural network. The present disclosure does not limit the types of the first neural network and the second neural network. For example, if the dimension of the third feature information $V_j$ is 10, and the dimension of the second feature information P is 6, one vector space of the same dimension may be determined. For example, if the dimension of the vector space is 8, the ten-dimensional third feature information $V_j$ may be mapped to the eight-dimensional vector space using a first neural network $F_{vis}^{top}$ to obtain an eight-dimensional third feature vector $\tilde{V}_j$, and the six-dimensional second feature information P may be mapped to the eight-dimensional vector space using a second neural network $F_{text}^{top}$ to obtain an eight-dimensional second feature vector $\tilde{P}$. The present disclosure does not limit the number of dimensions.

In one possible implementation, a cosine similarity between the second feature vector $\tilde{P}$ and the third feature vector $\tilde{V}_j$ may be determined, and the cosine similarity between $\tilde{P}$ and $\tilde{V}_j$ is determined as a first correlation score St(V; P) between the query text paragraph and the first video.

In one possible implementation, third feature information $V_1, V_2, \ldots, V_N$ of each video in the video library may be mapped by using the first neural network $F_{vis}^{top}$ to obtain third feature vectors $\tilde{V}_1, \tilde{V}_2, \ldots, \tilde{V}_N$ of all the videos in the video library, and cosine similarities between the second feature vector $\tilde{P}$ and the third feature vectors $\tilde{V}_1, \tilde{V}_2, \ldots, \tilde{V}_N$ of all the videos are determined respectively, and are taken as first correlation scores between the query text paragraph and the videos, respectively. The preselected videos in the plurality of videos are determined according to the first correlation scores. For example, the video with the first correlation score above a certain score threshold may be selected as the preselected video, or the plurality of videos are sorted according to the first correlation scores, and a predetermined number of videos in the sequence are selected as the preselected videos. The present disclosure does not limit the method for selecting the preselected videos as well as the number of the preselected videos.

In this way, the first correlation scores between the query text paragraph and the videos are determined according to the second feature information and the third feature information, and the preselected videos are selected according to the first correlation scores, thereby improving the selection accuracy of the preselected video. Moreover, after the preselected videos are selected, the preselected videos may be processed without processing all the videos in the video library, thereby saving the operation costs and improving the processing efficiency.

In one possible implementation, the first neural network and the second neural network may be trained prior to mapping processing using the first neural network and the second neural network. The method further includes: training the first neural network and the second neural network according to third sample feature information of a sample video and second sample feature information of a sample text paragraph.

In one possible implementation, a video in the video library may be taken as a sample video, and a video in other video libraries may also be taken as a sample video. The present disclosure does not limit the sample video. Fourth sample feature information of video frames of the sample video may be extracted and third sample feature information of the sample video is determined according to the fourth sample feature information.

In one possible implementation, any query text paragraph may be entered as a sample text paragraph. The sample text paragraph may include one or more sentences, first sample feature information of a training sentence may be extracted, and second sample feature information of the sample text paragraph is determined according to the first sample feature information. In the sample videos, there is a video corresponding to the sample text paragraph, i.e., there is a condition that the content of a certain sample video matches the content of the sample text paragraph.

In one possible implementation, the third sample feature information of the plurality of sample videos may be input to the first neural network for mapping to obtain third sample feature vectors. The second sample feature information of the sample text paragraph may be input to the second neural network to obtain a second sample feature vector.

In one possible implementation, a cosine similarity between the second sample feature vector and each third sample feature vector is determined respectively, and a first integrated network loss is determined according to the cosine similarity. In an example, the first integrated network loss may be determined according to the following formula (1):

$$L^{find} = \Sigma_a \Sigma_{b \neq a} \max(0, S_t(V_b, P_a) - S_t(V_a, P_a) + a) \quad (1),$$

where $L^{find}$ is the first integrated network loss, $S_t(V_b, P_a)$ is the cosine similarity between a second sample feature vector of the $a^{-th}$ sample text paragraph and the third sample feature vector of the $b^{-th}$ sample video, $V_a$ is third sample feature information of the sample video corresponding to the $a^{-th}$ sample text paragraph, $S_t(V_a, P_a)$ is the cosine similarity between the second sample feature vector of the a sample text paragraph and the third sample feature vector of the corresponding sample video, both a and b are positive integers, and a is a set constant. In an example, a may be set as 0.2. In one possible implementation, network parameter values of the first neural network and the second neural network may be adjusted using the first integrated network loss. In an example, the network parameter values of the first neural network and the second neural network are adjusted by minimizing the first integrated network loss, so that the adjusted first neural network and second neural network have high goodness of fit while and will not be over-fit. The present disclosure does not limit the method for adjusting the network parameter values of the first neural network and the second neural network. In one possible implementation, the step of adjusting the network parameter values of the first neural network and the second neural network may be performed in a loop, and the network parameter values of the first neural network and the second neural network are successively adjusted by reducing or converging the first integrated network loss. In an example, the sample text paragraph with a predetermined number of times may be entered, i.e., a predetermined number of times of loop execution. In an example, the number of times of loop execution may be not limited. When the first integrated network loss is reduced to a certain degree or converged within a certain threshold, the loop is stopped, and the first neural network and the second neural network after loop adjustment are obtained. The first neural network and the second neural network after loop adjustment may be used to map the third feature information of the first video and the second feature information of the query text paragraph.

Figure 3:
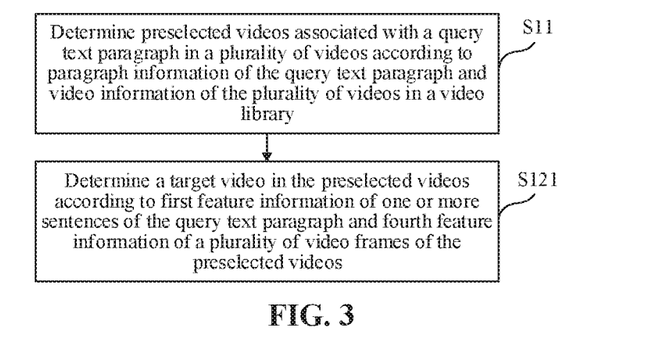
FIG. 3 illustrates a flowchart of a method for video processing according to embodiments of the present disclosure.

FIG. 3 illustrates a flowchart of a method for video processing according to embodiments of the present disclosure. As shown in FIG. 3, step S12 includes the following steps.

At step S121, the target video in the preselected videos is determined according to the first feature information of the one or more sentences of the query text paragraph and the fourth feature information of the plurality of video frames of the preselected videos.

In one possible implementation, the correlation between the query text paragraph and the videos in the preselected videos may be further determined according to the first feature information of the one or more sentences and the fourth feature information of the plurality of video frames of the preselected videos.

In one possible implementation, determining the target video in the preselected videos according to the first feature information of the one or more sentences and the fourth feature information of the plurality of video frames of the preselected videos includes: determining second correlation scores between the query text paragraph and the preselected videos according to the first feature information of the one or more sentences and the fourth feature information of the plurality of video frames of the preselected videos; and determining the target video in the preselected videos according to the first correlation scores and the second correlation scores.

In one possible implementation, determining the second correlation scores between the query text paragraph and the preselected videos according to the first feature information of the one or more sentences and the fourth feature information of the plurality of video frames of the preselected videos may include: mapping fourth feature information of a plurality of video frames of a target preselected video and the first feature information of the one or more sentences to a vector space of the same dimension, to obtain fourth feature vectors of the plurality of video frames of the target preselected video and first feature vectors of the one or more sentences, respectively, where the target preselected video is any one of the preselected videos; determining, from the fourth feature vectors, target feature vectors whose cosine similarities to a first feature vector of a target sentence are greater than or equal to a similarity threshold, where the target sentence is any one of the one or more sentences; aggregating video frames corresponding to the target feature vectors into a video clip corresponding to the target sentence; determining a fifth feature vector of the video clip corresponding to the target sentence according to the target feature vector; and determining a second correlation score between the query text paragraph and the target preselected video according to fifth feature vectors of video clips respectively corresponding to the one or more sentences and the first feature vectors of the one or more sentences.

In this way, the second correlation score between the query text paragraph and the target preselected video may be determined according to the fourth feature vectors of the plurality of video frames of the target preselected video and the first feature vectors of the one or more sentences, and the correlation between the semantic content of the query text paragraph and the target preselected video may be accurately determined.

In one possible implementation, the dimensions of the fourth feature information of the plurality of video frames of the target preselected video and the first feature information of the one or more sentences are different, and the fourth feature information and the first feature information may be mapped to a vector space of the same dimension by means of mapping. In an example, the fourth feature information of the plurality of video frames of the target preselected video may be feature vectors $f_1, f_2, \ldots, f_K$ (K is the number of the video frames of the target preselected video and is a positive integer); the first feature information of the one or more sentences may be $s_1, s_2, \ldots, s_M$ (M is the number of the sentences of the query text paragraph and is a positive integer); $f_1, f_2, \ldots, f_K$ and $s_1, s_2, \ldots, s_M$ may be mapped to a vector space of the same dimension with a mapping method, so as to obtain fourth feature vectors $\tilde{f}_1, \tilde{f}_2, \ldots, \tilde{f}_K$ and first feature vectors $\tilde{s}_1, \tilde{s}_2, \ldots, \tilde{s}_M$.

In one possible implementation, the fourth feature information and the first feature information may be mapped to a vector space of the same dimension by using a neural network. In an example, mapping the fourth feature information of the plurality of video frames of the target preselected video and the first feature information of the one or more sentences to the vector space of the same dimension, to obtain the fourth feature vectors of the plurality of video frames of the target preselected video and the first feature vectors of the one or more sentences, respectively include: mapping the fourth feature information as the fourth feature vectors by using a third neural network, and mapping the first feature information as the first feature vector by using a fourth neural network.

In an example, the third neural network and the fourth neural network may be a BP neural network, a convolutional neural network, or a recurrent neural network. The present disclosure does not limit the types of the third neural network and the fourth neural network. For example, if the dimensions of the fourth feature information $f_1, f_2, \ldots, f_K$ are 10, and the dimensions of the second feature information $s_1, s_2, \ldots, s_M$ are 6, one vector space of the same dimension may be determined. For example, if the dimension of the vector space is 8, the ten-dimensional fourth feature information $f_1, f_2, \ldots, f_K$ may be mapped to the eight-dimensional vector space using a third neural network $F_{vis\_}^{top}$ to obtain eight-dimensional fourth feature vectors $\tilde{f}_1, \tilde{f}_2, \ldots, \tilde{f}_K$, and the six-dimensional first feature information $s_1, s_2, \ldots, s_M$ may be mapped to the eight-dimensional vector space using a fourth neural network $F_{text}^{ref}$ to obtain eight-dimensional first feature vectors $\tilde{s}_1, \tilde{s}_2, \ldots, \tilde{s}_M$. The present disclosure does not limit the number of dimensions.

In one possible implementation, target feature vectors whose cosine similarities to a first feature vector of a target sentence are greater than or equal to a similarity threshold may be determined from the fourth feature vectors. In an example, one sentence may be arbitrarily selected from one or more sentences as a target sentence (e.g., the $y^{-th}$ sentence is selected as a target sentence, and $1 \leq y \leq K$), cosine similarities between the plurality of fourth feature vectors $\tilde{f}_1, \tilde{f}_2, \ldots, \tilde{f}_K$, of the target preselected video and the first feature vector $s_y$ of the target sentence are calculated respectively, and the target feature vector whose cosine similarity to the first feature vector $s_y$ is greater than or equal to a similarity threshold is determined from the plurality of fourth feature vectors $\tilde{f}_1, \tilde{f}_2, \ldots, \tilde{f}_K$, for example $\tilde{f}_h, \tilde{f}_u, \ldots, \tilde{f}_q$, where $1 \leq h \leq K$, $1 \leq u \leq K$, and $1 \leq q \leq K$, and the similarity threshold may be a preset threshold, such as 0.5. The present disclosure does not limit the similarity threshold.

In one possible implementation, video frames corresponding to the target feature vectors may be aggregated into a video clip corresponding to the target sentence. In an example, the fourth feature information may be a feature vector obtained by selecting one video frame from the target preselected video every other 5 video frames (i.e., every 6 video frames) for feature extraction processing, the fourth feature vectors are feature vectors obtained by mapping the fourth feature information, and the video frame corresponding to each fourth feature vector may be the video frame used to extract the fourth feature information and the five video frames before or after the video frame. The video frames corresponding to all the target feature vectors may be aggregated together to obtain a video clip, which is the video clip corresponding to the target sentence, for example, aggregating the video frames corresponding to $\tilde{f}_h, \tilde{f}_u, \ldots, \tilde{f}_q$, to obtain a video clip corresponding to the target sentence. The present disclosure does not limit the video frames corresponding to the target feature vectors.

In one possible implementation, a video clip corresponding to a feature vector of each sentence may be determined in a target preselected video, and the position corresponding to the semantic content of each sentence in the target preselected video is determined according to information such as a timestamp or a frame number of the video frame included in the video clip respectively corresponding to the feature vector of each sentence.

In one possible implementation, a fifth feature vector of the video clip corresponding to the target sentence is determined according to the target feature vectors. In an example, the target feature vectors $\tilde{f}_h, \tilde{f}_u, \ldots, \tilde{f}_q$, may be summed, averaged, or otherwise processed to be fused into a fifth feature vector. In an example, a target sentence may have a plurality of corresponding video clips, for example, the target feature vectors may be $\tilde{f}_h, \tilde{f}_{h+1}, \tilde{f}_{h+2}, \ldots, \tilde{f}_u, \tilde{f}_{u+1}, \tilde{f}_{u+2}, \ldots \tilde{f}_q, \tilde{f}_{q+1}, \tilde{f}_{q+2}, \ldots$ where $\tilde{f}_h, \tilde{f}_{h+1}, \tilde{f}_{h+2}, \ldots$ are adjacent target feature vectors, $\tilde{f}_u, \tilde{f}_{u+1}, \tilde{f}_{u+2}, \ldots$ are adjacent target feature vectors, and $\tilde{f}_q, \tilde{f}_{q+1}, \tilde{f}_{q+2}, \ldots$ are adjacent target feature vectors. $\tilde{f}_h, \tilde{f}_{h\pm1}, \tilde{f}_{h\pm2}, \ldots$ may be fused into a fifth feature vector $g_{y1}$, $\tilde{f}_u, \tilde{f}_{u\pm1}, \tilde{f}_{u\pm2}, \ldots$ may be fused into a fifth feature vector $g_{y2}$, and $\tilde{f}_q, \tilde{f}_{q+1}, \tilde{f}_{q+2}, \ldots$ may be fused into a fifth feature vector $g_{y3}$. That is, each sentence may correspond to one or more fifth feature vectors. In an example, each fifth feature vector may correspond to one sentence.

In one possible implementation, a second correlation score between the query text paragraph and the target preselected video is determined according to fifth feature vectors of video clips respectively corresponding to the one or more sentences and the first feature vectors of the one or more sentences. In an example, the first feature vectors of the plurality of sentences are $\tilde{s}_1, \tilde{s}_2, \ldots, \tilde{s}_M$, where M is a positive integer, the fifth feature vectors of the plurality of video clips are $g_1, g_2, \ldots, g_w$, where W is a positive integer. The fifth feature vectors corresponding to the first feature vector $\tilde{s}_1$ are $g_1, g_2, \ldots, g_O$ (O is the number of the fifth feature vectors corresponding to the first feature vector $\tilde{s}_1$, and is a positive integer less than W), the fifth feature vectors corresponding to $\tilde{s}_2$ are $g_{O+1}, g_{O+2}, \ldots, g_v$ (V is the number of the fifth feature vectors corresponding to the first feature vector $\tilde{s}_2$, and is a positive integer less than W and greater than O), and the fifth feature vectors corresponding to $\tilde{s}_M$ are $g_z, g_{z+1}, \ldots, g_w$ (Z is the number of the fifth feature vectors corresponding to the first feature vector $\tilde{s}_2$, and is a positive integer less than W and greater than O).

In one possible implementation, the second correlation score between the query text paragraph and the target preselected video may be determined according to the following formula (2):

$$S_p(V,P) = \text{maximize } \Sigma_i^M \Sigma_j^W x_{ij} r_{ij} \qquad (2),$$

where $x_{ij}$ represents whether the $i^{-th}$ sentence corresponds to the $j^{-th}$ video clip, and when a fifth feature vector of the $j^{-th}$ video clip is the fifth feature vector corresponding to the first feature vector of the $i^{-th}$ sentence, $x_{ij}=1$, and otherwise, $x_{ij}=0$. In an example, whether the $i^{-th}$ sentence and the $j^{-th}$ video match in a bipartite graph is determined, and if so, $x_{ij}=1$, and otherwise, $x_{ij}=0$. In an example, for the $i^{-th}$ sentence, $\sum_j^W x_{ij} \leq u_{max}$, that is, in the target preselected video, one sentence has at most $u_{max}$ corresponding video clips, where $u_{max}$ is the number of preset video clips, and $1 \leq u_{max} \leq W$. In an example, for the $j^{-th}$ video clip, $\sum_i^M x_{ij} \leq 1$, that is, in the target preselected video, each video clip only has one corresponding sentence. $r_{ij}$ is a cosine similarity between the first feature vector of the $i^{-th}$ Sentence and the fifth feature vector of the $j^{-th}$ video clip. $S_p(V,P)$ is a second correlation score between the query text paragraph and the target preselected video.

In one possible implementation, a third correlation score $S_r(V,P)$ between the query text paragraph and the target preselected video may be determined according to the first correlation score $S_t(V,P)$ between the query text paragraph and the target preselected video and the second correlation score $S_p(V,P)$ between the query text paragraph and the target preselected video, and the third correlation score between the query text paragraph and each preselected video may be determined. In an example, products of the first correlation scores and the second correlation scores are determined as third correlation scores, and a target video in the preselected videos is determined according to the third correlation scores. The preselected videos may be sorted according to the third correlation score between the query text paragraph and each preselected video, a predetermined number of videos in the sorted sequence may be selected, and a video with the third correlation score greater than or equal to a certain score threshold may also be selected. The present disclosure does not limit the method for selecting the target video.

In one possible implementation, the third neural network and the fourth neural network may be trained prior to mapping processing using the third neural network and the fourth neural network. The method further includes: training a third neural network and a fourth neural network according to fourth sample feature information of a plurality of video frames of a sample video and first sample feature information of one or more sentences of a sample text paragraph.

In one possible implementation, a video in the video library may be taken as a sample video, and a video in other video libraries may also be taken as a sample video. The present disclosure does not limit the sample video. Fourth sample feature information of video frames of the sample video may be extracted. Any query text paragraph may be entered as a sample text paragraph. The sample text paragraph may include one or more sentences, and first sample feature information of a training sentence may be extracted.

In one possible implementation, the fourth sample feature information of the plurality of video frames of the sample video may be input to the third neural network to obtain fourth sample feature vectors. The first sample feature information of the one or more sentences of the sample text paragraph may be input to the fourth neural network to obtain first sample feature vectors.

In one possible implementation, a target sample feature vector whose cosine similarity to a first target sample feature vector is greater than or equal to a similarity threshold may be determined from the fourth feature vector, where the first target sample feature vector is any one of the first sample feature vectors. Further, the target sample feature vectors may be fused into a fifth sample feature vector corresponding to the first target sample feature vector. In an example, a fifth sample feature vector corresponding to each first sample feature vector may be determined, respectively.

In one possible implementation, a cosine similarity between each fifth sample feature vector and the first sample feature vector is determined respectively, and a second integrated network loss is determined according to the cosine similarity. In an example, the second integrated network loss may be determined according to the following formula (3):

$$L^{ref} = \Sigma_d \max(0, s(g_d, \tilde{s}) - s(g^+, \tilde{s}) + \beta) \qquad (3),$$

where $L^{ref}$ is the second integrated network loss, $\tilde{s}$ is the first target sample feature vector, $g_d$ is the $d^{-th}$ fifth sample feature vector, $g^+$ is the fifth sample feature vector corresponding to the first target sample feature vector, $s(g_d, \tilde{s})$ is the cosine similarity between $g_d$ and $\tilde{s}$, $s(g^+, \tilde{s})$ is a cosine similarity between $g^+$ and $\tilde{s}$, and $\beta$ is a preset constant. In an example, $\beta$ may be set as 0.1.

In one possible implementation, network parameter values of the third neural network and the fourth neural network may be adjusted using the second integrated network loss. In an example, the network parameter values of the third neural network and the fourth neural network are adjusted by minimizing the second integrated network loss, so that the adjusted third neural network and fourth neural network have high goodness of fit and will not be over-fit. The present disclosure does not limit the method for adjusting the network parameter values of the third neural network and the fourth neural network.

In one possible implementation, the step of adjusting the network parameter values of the third neural network and the fourth neural network may be performed in a loop, and the network parameter values of the third neural network and the fourth neural network are successively adjusted by reducing or converging the second integrated network loss. In an example, the sample text paragraph or sample video with a predetermined number of times may be entered. i.e., a predetermined number of times of loop execution. In an example, the number of times of loop execution may be not limited. When the second integrated network loss is reduced to a certain degree or converged within a certain threshold, the loop is stopped, and the third neural network and the fourth neural network after loop adjustment are obtained. The third neural network and the fourth neural network after loop adjustment may be used to map the fourth feature information of the plurality of video frames of the target preselected video and the first feature information of the one or more sentences.

Figure 4:
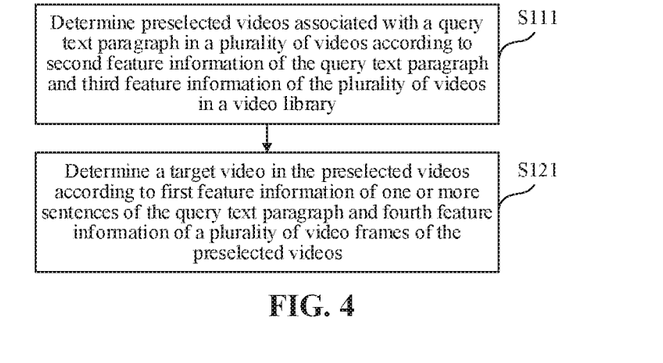
FIG. 4 illustrates a flowchart of a method for video processing according to embodiments of the present disclosure.

FIG. 4 illustrates a flowchart of a method for video processing according to embodiments of the present disclosure. In conclusion, at step S111, preselected videos are determined according to the second feature information of the query text paragraph and the third feature information, and at step S121, a target video is determined from the preselected videos according to the first feature information of the one or more sentences of the query text paragraph and the fourth feature information. Reference is made to the embodiments for detailed processing modes of the method for video processing, and the description is not repeated here.

Figure 5:
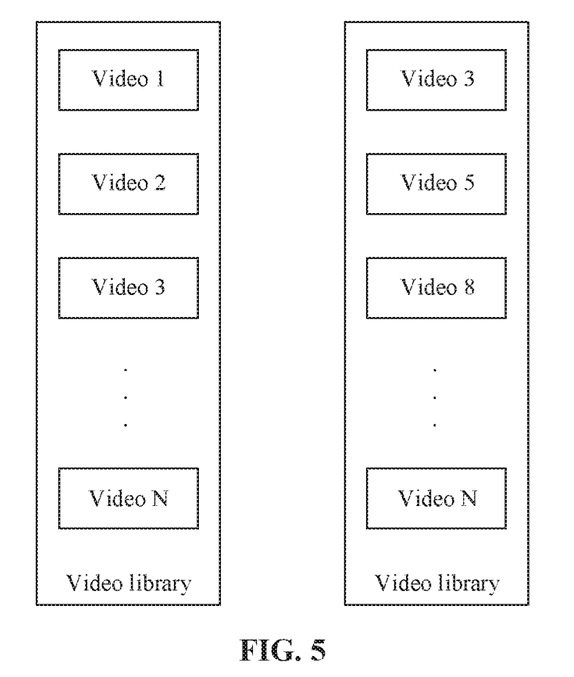
FIG. 5 illustrates a schematic application diagram of a method for video processing according to embodiments of the present disclosure.

FIG. 5 illustrates a schematic application diagram of a method for video processing according to embodiments of the present disclosure. As shown FIG. 5, the video library may include N videos, fourth feature information of a plurality of video frames of each video may be obtained, respectively, and third feature information for each video is obtained according to the fourth feature information.

In one possible implementation, a query text paragraph may be entered, the query text paragraph may include one or more sentences, first feature information of each sentence may be extracted, and second feature information of the query text paragraph is determined according to the first feature information.

In one possible implementation, the dimensions of the third feature information and the second feature information may be different, the third feature information may be mapped as a third feature vector through a first neural network, and the second feature information may be mapped as a second feature vector through a second neural network. The third feature vector and the second feature vector are in a vector space of the same dimension. A cosine similarity between the second feature vector of the query text paragraph and the third feature vector of each video may be determined respectively, and the cosine similarity is determined as a first correlation score between the query text paragraph and each video. The videos in the video library may be sorted according to the first correlation scores, for example, the video library on the left in FIG. 6, and a video sequence obtained by ordering the videos in the video library according to the first correlation scores is Video 1, Video 2, Video 3, . . . Video N. The first E (1≤E≤N) videos are selected from the video library as preselected videos.

In one possible implementation, the fourth feature information of the preselected videos may be mapped as fourth feature vectors using a third neural network, and the first feature information of the one or more sentences of the query text paragraph may be mapped as the first feature vectors using a fourth neural network. The fourth feature vector and the first feature vector are in a vector space of the same dimension. In a target preselected video, the fourth feature vectors whose cosine similarities to a first feature vector of a target sentence are greater than or equal to a similarity threshold may be determined as target feature vectors, video frames of the target preselected video corresponding to the target feature vectors may be aggregated into a video clip, and the target feature vectors may also be fused into a fifth feature vector. A second correlation score between the query text paragraph and the target preselected video may be determined by formula (2). Further, a second correlation score between the query text paragraph and each preselected video may be determined.

Figure 6:
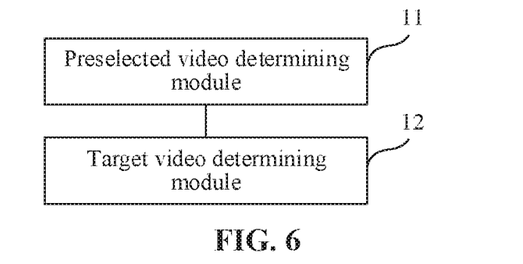
FIG. 6 illustrates a block diagram of a device for video processing according to embodiments of the present disclosure.

In one possible implementation, the first correlation scores between the query text paragraph and the preselected videos may be multiplied with the second correlation scores between the query text paragraph and the preselected videos to obtain third correlation scores between the query text paragraph and the preselected videos, and E preselected videos are sorted according to the third correlation scores, for example, the video library on the right in FIG. 6. A video sequence obtained by sorting the E preselected videos according to the third correlation scores is Video 3, Video 5, Video 8 . . . . According to this sequencing. Video 3 is the video with the highest third correlation score, i.e., the video with the highest correlation to the semantic content of the query text paragraph, followed by Video 5, Video 8, . . . , Video 3 may be selected as a target video, and the first X (X≤E) videos may also be selected as target videos.

According to the method for video processing in the embodiments of the present disclosure, a cosine similarity between the second feature vector of the query text paragraph and the third feature vector of the video is determined as a first correlation score between the query text paragraph and the video, and the correlation between the semantic content of the query text paragraph and the feature information of the video may be accurately determined, so that the preselected videos are accurately selected. After the preselected videos are selected, the preselected videos may be processed without processing all the videos in the video library, thereby saving the operation costs and improving the processing efficiency. Further, a second correlation score between the query text paragraph and the target preselected video may be determined according to the fourth feature vectors of the plurality of video frames of the target preselected video and the first feature vectors of the one or more sentences, and a target video is determined according to the second correlation score and the first correlation score. Videos are retrieved through correlations between the videos and a query text paragraph, so that a target video can be accurately found and the query result redundancy is avoided. Moreover, the query text paragraph in the natural language form may be processed without being limited by the inherent content of a content tag.

It may be understood that the foregoing method embodiments mentioned in the present disclosure may be combined with each other to obtain a combined embodiment without departing from the principle and the logic. Details are not described in the present disclosure again due to space limitation.

In addition, the present disclosure further provides a device for video processing, an electronic device, a computer-readable storage medium, and a program. The foregoing are all configured to implement any method for video processing provided in the present disclosure. For corresponding technical solutions and descriptions, refer to corresponding descriptions of the method. Details are not described again.

A person skilled in the art can understand that, in the foregoing methods of the specific implementations, the order in which the steps are written does not imply a strict execution order which constitutes any limitation to the implementation process, and the specific order of executing the steps should be determined by functions and possible internal logics thereof.

FIG. 6 illustrates a block diagram of a device for video processing according to embodiments of the present disclosure. As shown in FIG. 6, the device further includes:

a preselected video determining module 11, configured to determine preselected videos associated with a query text paragraph in a plurality of videos according to paragraph information of the query text paragraph and video information of the plurality of videos in a video library; and a target video determining module 12, configured to determine a target video in the preselected videos according to video frame information of the preselected videos and sentence information of the query text paragraph.

The sentence information includes first feature information of one or more sentences of the query text paragraph, the paragraph information includes second feature information of the query text paragraph, the video frame information includes fourth feature information of a plurality of video frames of the videos, and the video information includes third feature information of the videos.

The preselected video determining module is further configured to:

determine the preselected videos associated with the query text paragraph in the plurality of videos according to the second feature information and the third feature information of the plurality of videos in the video library.

In one possible implementation, the device further includes:

a sentence feature extracting module, configured to perform feature extraction processing on the one or more sentences of the query text paragraph respectively to obtain the first feature information of the one or more sentences; and a second determining module, configured to determine the second feature information of the query text paragraph according to the first feature information of the one or more sentences of the query text paragraph.

In one possible implementation, the device further includes:

a video feature extracting module, configured to perform feature extraction processing on a plurality of video frames of a second video respectively to obtain fourth feature information of the plurality of video frames of the second video, where the second video is any one of the plurality of videos; and a first determining module, configured to determine third feature information of the second video according to the fourth feature information of the plurality of video frames of the second video.

In one possible implementation, the preselected video determining module is further configured to:

determine first correlation scores between the query text paragraph and the plurality of videos respectively according to the second feature information and the third feature information of the plurality of videos in the video library; and determining the preselected videos in the plurality of videos according to the first correlation scores.

In one possible implementation, the preselected video determining module is further configured to:

map third feature information of a first video and the second feature information to a vector space of the same dimension, to obtain a third feature vector of the first video and a second feature vector of the query text paragraph, where the first video is any one of the plurality of videos; and determine a cosine similarity between the second feature vector and the third feature vector as a first correlation score between the query text paragraph and the first video.

In one possible implementation, the target video determining module is further configured to:

determine the target video in the preselected videos according to the first feature information of the one or more sentences and the fourth feature information of the plurality of video frames of the preselected videos.

In one possible implementation, the target video determining module is further configured to:

determine second correlation scores between the query text paragraph and the preselected videos according to the first feature information of the one or more sentences and the fourth feature information of the plurality of video frames of the preselected videos; and determine the target video in the preselected videos according to the first correlation scores and the second correlation scores.

In one possible implementation, the target video determining module is further configured to:

map fourth feature information of a plurality of video frames of a target preselected video and the first feature information of the one or more sentences to a vector space of the same dimension, to obtain fourth feature vectors of the plurality of video frames of the target preselected video and first feature vectors of the one or more sentences, respectively, where the target preselected video is any one of the preselected videos;

determine, from the fourth feature vectors, target feature vectors whose cosine similarities to a first feature vector of a target sentence are greater than or equal to a similarity threshold, where the target sentence is any one of the one or more sentences;

aggregate video frames corresponding to the target feature vectors into a video clip corresponding to the target sentence;

determine a fifth feature vector of the video clip corresponding to the target sentence according to the target feature vector; and determine a second correlation score between the query text paragraph and the target preselected video according to fifth feature vectors of video clips respectively corresponding to the one or more sentences and the first feature vectors of the one or more sentences.

In one possible implementation, the target video determining module is further configured to:

determine products of the first correlation scores and the second correlation scores as third correlation scores; and determine the target video in the preselected videos according to the third correlation scores.

In some embodiments, the functions provided by or the modules included in the device provided by the embodiments of the present disclosure may be used for implementing the method described in the foregoing method embodiments. For specific implementations, reference may be made to the description in the method embodiments above. For the purpose of brevity, details are not described herein again.

The embodiments of the present disclosure further provide a computer-readable storage medium, having computer program instructions stored thereon, where when the computer program instructions are executed by a processor, the foregoing method is implemented. The computer-readable storage medium may be a non-volatile computer-readable storage medium.

The embodiments of the present disclosure further provide an electronic device, including: a processor; and a memory configured to store processor-executable instructions, where the processor is configured to implement the foregoing method.

The electronic device may be provided as a terminal, a server, or a device in another form.

Figure 7:
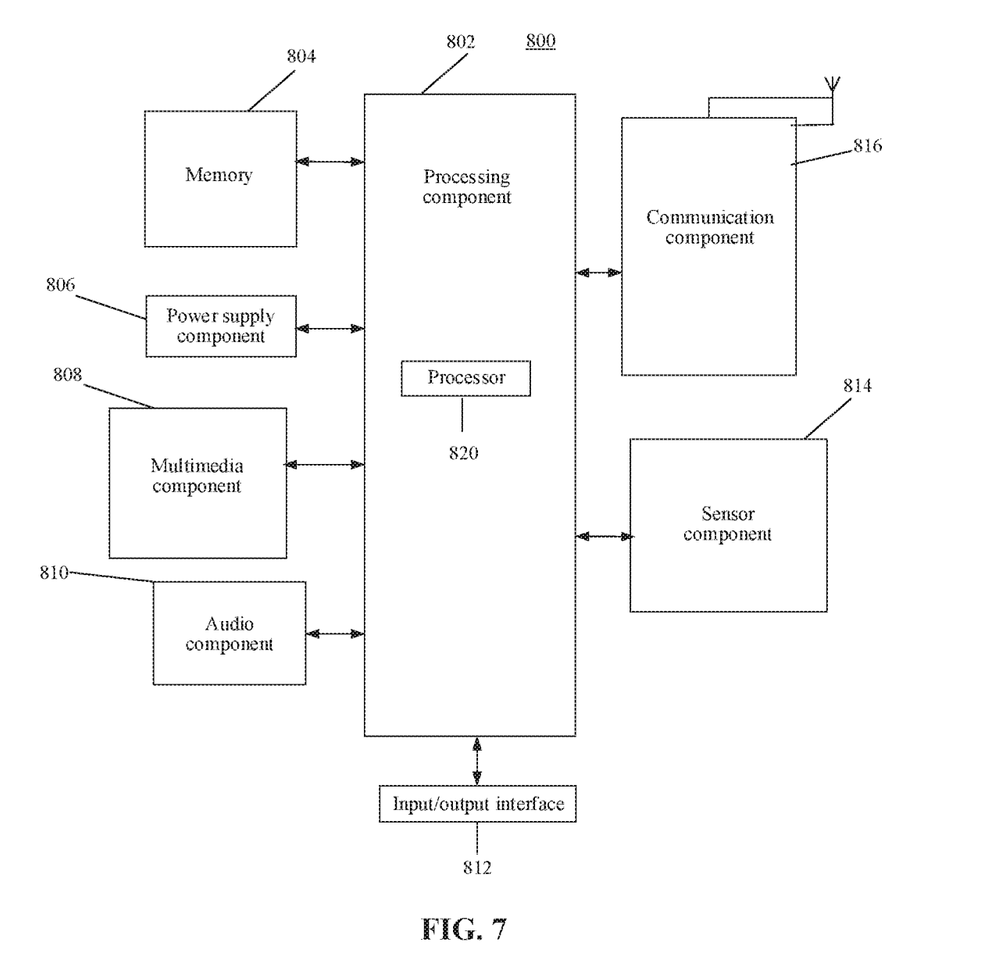
FIG. 7 illustrates a block diagram of an electronic device according to embodiments of the present disclosure.

FIG. 7 is a block diagram of an electronic device 800 according to one exemplary embodiment. For example, the electronic device 800 may be a terminal such as a mobile phone, a computer, a digital broadcast terminal, a message transceiving device, a game console, a tablet device, a medical device, exercise equipment, and a personal digital assistant.

Referring to FIG. 7, the electronic device 800 may include one or more of the following components; a processing component 802, a memory 804, a power supply component 806, a multimedia component 808, an audio component 810, an Input/Output (I/O) interface 812, a sensor component 814, and a communication component 816.

The processing component 802 generally controls overall operation of the electronic device 800, such as operations associated with display, phone calls, data communications, camera operations, and recording operations. The processing component 802 may include one or more processors 820 to execute instructions to implement all or some of the steps of the method above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations on the electronic device 800. Examples of the data include instructions for any application or method operated on the electronic device 800, contact data, contact list data, messages, pictures, videos, and the like. The memory 804 may be implemented by any type of volatile or non-volatile storage device, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or an optical disk.

The power supply component 806 provides power for various components of the electronic device 800. The power supply component 806 may include a power management system, one or more power supplies, and other components associated with power generation, management, and distribution for the electronic device 800.

The multimedia component 808 includes a screen between the electronic device 800 and a user that provides an output interface. In some embodiments, the screen may include a Liquid Crystal Display (LCD) and a Touch Panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the electronic device 800 is in an operation mode, for example, a photography mode or a video mode, the front-facing camera and/or the rear-facing camera may receive external multimedia data. Each of the front-facing camera and the rear-facing camera may be a fixed optical lens system, or have focal length and optical zoom capabilities.

The audio component 810 is configured to output and/or input an audio signal. For example, the audio component 810 includes a microphone (MIC), and the microphone is configured to receive an external audio signal when the electronic device 800 is in an operation mode, such as a calling mode, a recording mode, and a voice recognition mode. The received audio signal may be further stored in the memory 804 or transmitted by means of the communication component 816. In some embodiments, the audio component 810 further includes a speaker for outputting the audio signal.

The I/O interface 812 provides an interface between the processing component 802 and a peripheral interface module, which may be a keyboard, a click wheel, a button, etc. The button may include, but is not limited to, a home button, a volume button, a start button, and a lock button.

The sensor component 814 includes one or more sensors for providing state assessment in various aspects for the electronic device 800. For example, the sensor component 814 may detect an on/off state of the electronic device 800, and relative positioning of components, which are the display and keypad of the electronic device 800, for example, and the sensor component 814 may further detect a position change of the electronic device 800 or a component of the electronic device 800, the presence or absence of contact of the user with the electronic device 800, the orientation or acceleration/deceleration of the electronic device 800, and a temperature change of the electronic device 800. The sensor component 814 may include a proximity sensor, which is configured to detect the presence of a nearby object when there is no physical contact. The sensor component 814 may further include a light sensor, such as a CMOS or CCD image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the electronic device 800 and other devices. The electronic device 800 may access a wireless network based on a communication standard, such as WiFi, 2G, or 3G, or a combination thereof. In an exemplary embodiment, the communication component 816 receives a broadcast signal or broadcast-related information from an external broadcast management system by means of a broadcast channel. In one exemplary embodiment, the communication component 816 further includes a Near Field Communication (NFC) module to facilitate short-range communication. For example, the NFC module may be implemented based on radio frequency identification (RFID) technology, infrared data association (IrDA) technology, ultra-wideband (UWB) technology. Bluetooth (BT) technology, and other technologies.

In an exemplary embodiment, the electronic device 800 may be implemented by one or more application-specific integrated circuits (ASICs) digital signal processors (DSPs), digital signal processing devices (DSPDs), programmable logic devices (PLDs), field-programmable gate arrays (FPGAs), controllers, microcontrollers, microprocessors, or other electronic elements, to execute the method above.

In an exemplary embodiment, a non-volatile computer-readable storage medium is further provided, for example, a memory 804 including computer program instructions, which can executed by the processor 820 of the electronic device 800 to implement the method above.

Figure 8:
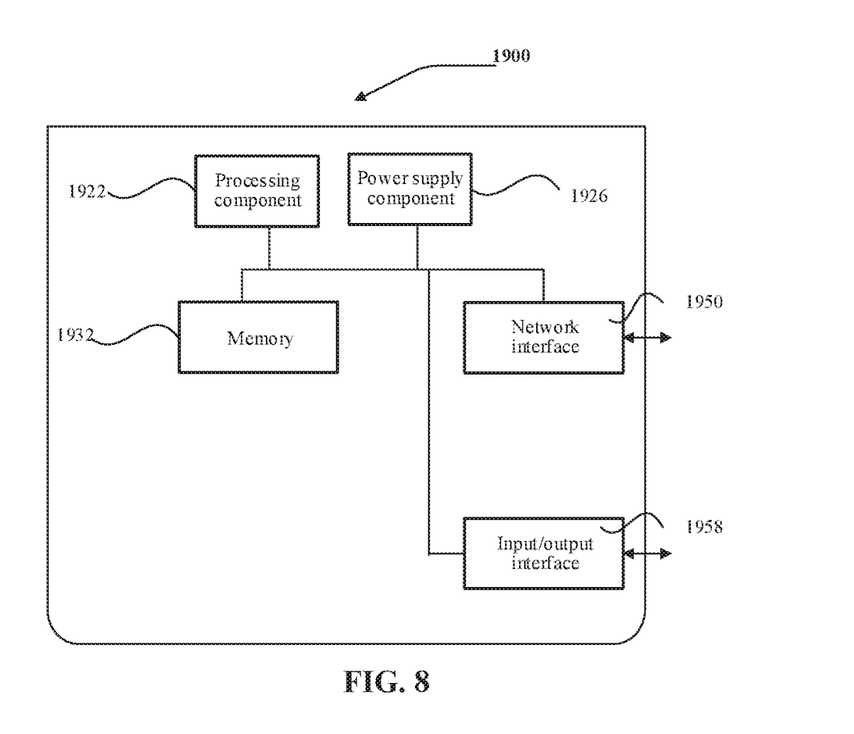
FIG. 8 illustrates a block diagram of an electronic device according to embodiments of the present disclosure.

FIG. 8 is a block diagram of an electronic device 1900 according to one exemplary embodiment. For example, the electronic device 1900 may be provided as a server. With reference to FIG. 8, the electronic device 1900 includes a processing component 1922 which further includes one or more processors, and a memory resource represented by a memory 1932 and configured to store instructions executable by the processing component 1922, for example, an application program. The application program stored in the memory 1932 may include one or more modules, each of which corresponds to a set of instructions. In addition, the processing component 1922 is configured to execute instructions so as to execute the above method.

The electronic device 1900 may further include a power supply component 1926 configured to execute power management of the electronic device 1900, a wired or wireless network interface 1950 configured to connect the electronic device 1900 to the network, and an input/output (I/O) interface 1958. The electronic device 1900 may be operated based on an operating system stored in the memory 1932, such as Windows Server™, Mac OS X™, Unix™, Linux™, FreeBSD™ or the like.

In an exemplary embodiment, a non-volatile computer-readable storage medium is further provided, for example, a memory 1932 including computer program instructions, which can be executed by the processing component 1922 of the electronic device 1900 to implement the method above.

The present disclosure may be a system, a method, and/or a computer program product. The computer program product may include a computer-readable storage medium having computer-readable program instructions thereon for causing a processor to carry out various aspects of the present disclosure.

The computer-readable storage medium may be a tangible device that can retain and store instructions for use by an instruction execution device. The computer-readable storage medium may be, but is not limited to, an electronic storage device, a magnetic storage device, an optical storage device, an electromagnetic storage device, a semiconductor storage device, or any suitable combination of the above ones. More specific examples (a non-exhaustive list) of the computer-readable storage medium include: a portable computer diskette, a hard disk, a Random Access Memory (RAM), an ROM, an EPROM (or flash memory), a SRAM, a portable Compact Disk Read-Only Memory (CD-ROM), a Digital Versatile Disc (DVD), a memory stick, a floppy disk, a mechanically encoded device such as punch-cards or raised structure in a groove having instructions stored thereon, and any suitable combination of the foregoing. A computer-readable storage medium used herein is not to be construed as being a transitory signal per se, such as a radio wave or other freely propagating electromagnetic waves, an electromagnetic wave propagating through a waveguide or other transmission media (e.g., a light pulse passing through a fiber-optic cable), or an electrical signal transmitted through a wire.

The computer-readable program instructions described herein can be downloaded to respective computing/processing devices from a computer-readable storage medium or to an external computer or external storage device via a network, for example, the Internet, a Local Area Network (LAN), a Wide Area Network (WAN) and/or a wireless network. The network may include a copper transmission cable, an optical transmission fiber, wireless transmission, a router, a firewall, a switch, a gateway computer and/or an edge server. A network adapter card or network interface in each computing/processing device receives computer-readable program instructions from the network and forwards the computer-readable program instructions for storage in a computer-readable storage medium within the respective computing/processing device.

Computer program instructions for carrying out operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk and C++, and conventional procedural programming languages, such as the "C" programming language or similar programming languages. The computer-readable program instructions may be executed entirely on the user's computer, partly on the user's computer, as a stand-alone software package, partly on the user's computer and partly on a remote computer or entirely on the remote computer or server. In a scenario involving a remote computer, the remote computer may be connected to the user's computer via any type of network, including a LAN or a WAN, or the connection may be made to an external computer (for example, via the Internet using an Internet service provider). In some embodiments, electronic circuitry including, for example, programmable logic circuitry, a Field-Programmable Gate Array (FPGA), or a Programmable Logic Array (PLA) may execute the computer-readable program instructions by utilizing state information of the computer-readable program instructions to personalize the electronic circuitry, so as to implement the aspects of the present disclosure.

The aspects of the present disclosure are described herein with reference to flowcharts and/or block diagrams of the method, apparatus (system), and computer program product according to the embodiments of the present disclosure. It should be understood that each block of the flowcharts and/or block diagrams, and combinations of the blocks in the flowcharts and/or block diagrams can be implemented by computer-readable program instructions.

The computer-readable program instructions may be provided to a processor of a general-purpose computer, a special-purpose computer, or other programmable data processing apparatuses to produce a machine, such that when the instructions are executed by the processor of the computer or other programmable data processing apparatuses, an apparatus for implementing the functions/acts specified in one or more blocks of the flowcharts and/or block diagrams is created. The computer-readable program instructions may also be stored in a computer-readable storage medium that can cause a computer, a programmable data processing apparatus, and/or other devices to function in a particular manner, such that the computer-readable medium having instructions stored thereon includes an article of manufacture including instructions which implement the aspects of the functions/acts specified in one or more blocks of the flowcharts and/or block diagrams.

The computer-readable program instructions may also be loaded onto a computer, other programmable data processing apparatuses, or other devices to cause a series of operational steps to be executed on the computer, other programmable apparatuses or other devices to produce a computer implemented process, such that the instructions executed on the computer, other programmable apparatuses or other devices implement the functions/acts specified in one or more blocks of the flowcharts and/or block diagrams.

The flowcharts and block diagrams in the accompanying drawings illustrate the architecture, functionality and operations of possible implementations of systems, methods, and computer program products according to multiple embodiments of the present disclosure. In this regard, each block in the flowcharts or block diagrams may represent a module, a program segment, or a portion of instruction, which includes one or more executable instructions for implementing a specified logical function. In some alternative implementations, the functions noted in the block may also occur out of the order noted in the accompanying drawings. For example, two blocks shown in succession may, in fact, be executed substantially concurrently, or the blocks may sometimes be executed in the reverse order depending upon the functionality involved. It should also be noted that each block of the block diagrams and/or flowcharts, and combinations of blocks in the block diagrams and/or flowcharts, can be implemented by a special purpose hardware-based system that performs the specified functions or acts or carried out by combinations of special purpose hardware and computer instructions.

The descriptions of the embodiments of the present disclosure have been presented for purposes of illustration, but are not intended to be exhaustive or limited to the embodiments disclosed. Many modifications and variations will be apparent to a person of ordinary skill in the art without departing from the scope and spirit of the described embodiments. The terms used herein are intended to best explain the principles of the embodiments, practical applications, or technical improvements to the technologies in the market, or to enable other persons of ordinary skill in the art to understand the embodiments disclosed herein.

The invention claimed is:

1. A method for video processing, comprising:
    determining preselected videos associated with a query text paragraph in a plurality of videos according to paragraph information of the query text paragraph and video information of the plurality of videos in a video library; and
    determining a target video in the preselected videos according to video frame information of the preselected videos and sentence information of the query text paragraph, wherein the sentence information comprises first feature information of one or more sentences of the query text paragraph, and the video frame information comprises fourth feature information of a plurality of video frames of the preselected videos.

2. The method according to claim 1, wherein the paragraph information comprises second feature information of the query text paragraph, and the video information comprises third feature information of the plurality of videos; and
    determining the preselected videos associated with the query text paragraph in the plurality of videos according to the paragraph information of the query text paragraph and the video information of the plurality of videos in the video library comprises:
    determining the preselected videos associated with the query text paragraph in the plurality of videos according to the second feature information of the query text paragraph and the third feature information of the plurality of videos in the video library.

3. The method according to claim 2, wherein determining the preselected videos associated with the query text paragraph in the plurality of videos according to the second feature information of the query text paragraph and the third feature information of the plurality of videos in the video library comprises:
    determining first correlation scores between the query text paragraph and the plurality of videos respectively according to the second feature information of the query text paragraph and the third feature information of the plurality of videos in the video library; and
    determining the preselected videos in the plurality of videos according to the first correlation scores.

4. The method according to claim 3, wherein determining the first correlation scores between the query text paragraph and the plurality of videos respectively according to the second feature information of the query text paragraph and the third feature information of the plurality of videos in the video library comprises:
    mapping third feature information of a first video and the second feature information of the query text paragraph to a vector space of a same dimension, to obtain a third feature vector of the first video and a second feature vector of the query text paragraph, wherein the first video is any one of the plurality of videos; and
    determining a cosine similarity between the second feature vector and the third feature vector as a first correlation score between the query text paragraph and the first video.

5. The method according to claim 1, wherein
    determining the target video in the preselected videos according to the video frame information of the preselected videos and the sentence information of the query text paragraph comprises:
    determining the target video in the preselected videos according to the first feature information of the one or more sentences of the query text paragraph and the fourth feature information of the plurality of video frames of the preselected videos.

6. The method according to claim 5, wherein determining the target video in the preselected videos according to the first feature information of the one or more sentences of the query text paragraph and the fourth feature information of the plurality of video frames of the preselected videos comprises:
- determining second correlation scores between the query text paragraph and the preselected videos according to the first feature information of the one or more sentences of the query text paragraph and the fourth feature information of the plurality of video frames of the preselected videos; and
- determining the target video in the preselected videos according to first correlation scores and the second correlation scores.

7. The method according to claim 6, wherein determining the second correlation scores between the query text paragraph and the preselected videos according to the first feature information of the one or more sentences of the query text paragraph and the fourth feature information of the plurality of video frames of the preselected videos comprises:
- mapping fourth feature information of a plurality of video frames of a target preselected video and the first feature information of the one or more sentences of the query text paragraph to a vector space of a same dimension, to obtain fourth feature vectors of the plurality of video frames of the target preselected video and first feature vectors of the one or more sentences of the query text paragraph, respectively, wherein the target preselected video is any one of the preselected videos;
- determining, from the fourth feature vectors, target feature vectors whose cosine similarities to a first feature vector of a target sentence are greater than or equal to a similarity threshold, wherein the target sentence is any one of the one or more sentences;
- aggregating video frames corresponding to the target feature vectors into a video clip corresponding to the target sentence;
- determining a fifth feature vector of the video clip corresponding to the target sentence according to the target feature vectors; and
- determining a second correlation score between the query text paragraph and the target preselected video according to fifth feature vectors of video clips respectively corresponding to the one or more sentences and the first feature vectors of the one or more sentences.

8. The method according to claim 6, wherein determining the target video in the preselected videos according to the first correlation scores and the second correlation scores comprises:
- determining products of the first correlation scores and the second correlation scores as third correlation scores; and
- determining the target video in the preselected videos according to the third correlation scores.

9. The method according to claim 1, further comprising:
- performing feature extraction processing on a plurality of video frames of a second video respectively to obtain fourth feature information of the plurality of video frames of the second video, wherein the second video is any one of the plurality of videos; and
- determining third feature information of the second video according to the fourth feature information of the plurality of video frames of the second video.

10. The method according to claim 1, further comprising:
- performing feature extraction processing on the one or more sentences of the query text paragraph respectively to obtain the first feature information of the one or more sentences of the query text paragraph; and
- determining second feature information of the query text paragraph according to the first feature information of the one or more sentences of the query text paragraph.

11. An electronic device, comprising:
- a processor; and
- a memory configured to store processor-executable instructions,
- wherein the processor is configured to:
  - determine preselected videos associated with a query text paragraph in a plurality of videos according to paragraph information of the query text paragraph and video information of the plurality of videos in a video library; and
  - determine a target video in the preselected videos according to video frame information of the preselected videos and sentence information of the query text paragraph, wherein the sentence information comprises first feature information of one or more sentences of the query text paragraph, and the video frame information comprises fourth feature information of a plurality of video frames of the preselected videos.

12. A computer-readable storage medium, having computer program instructions stored thereon, wherein when the computer program instructions are executed by a processor, a method comprising the following operations is implemented:
- determining preselected videos associated with a query text paragraph in a plurality of videos according to paragraph information of the query text paragraph and video information of the plurality of videos in a video library; and
- determining a target video in the preselected videos according to video frame information of the preselected videos and sentence information of the query text paragraph, wherein the sentence information comprises first feature information of one or more sentences of the query text paragraph, and the video frame information comprises fourth feature information of a plurality of video frames of the preselected videos.

13. The electronic device according to claim 11, wherein the paragraph information comprises second feature information of the query text paragraph, and the video information comprises third feature information of the plurality of videos; and
the processor is further configured to:
- determine the preselected videos associated with the query text paragraph in the plurality of videos according to the second feature information of the query text paragraph and the third feature information of the plurality of videos in the video library.

14. The electronic device according to claim 13, wherein the processor is further configured to:
- determine first correlation scores between the query text paragraph and the plurality of videos respectively according to the second feature information of the query text paragraph and the third feature information of the plurality of videos in the video library; and
- determine the preselected videos in the plurality of videos according to the first correlation scores.

15. The electronic device according to claim 14, wherein the processor is further configured to:
- map third feature information of a first video and the second feature information of the query text paragraph to a vector space of a same dimension, to obtain a third feature vector of the first video and a second feature vector of the query text paragraph, wherein the first video is any one of the plurality of videos; and determine a cosine similarity between the second feature vector and the third feature vector as a first correlation score between the query text paragraph and the first video.

16. The electronic device according to claim 11, wherein the processor is further configured to:
   determine the target video in the preselected videos according to the first feature information of the one or more sentences of the query text paragraph and the fourth feature information of the plurality of video frames of the preselected videos.

17. The electronic device according to claim 16, wherein the processor is further configured to:
   determine second correlation scores between the query text paragraph and
   the preselected videos according to the first feature information of the one or more sentences of the query text paragraph and the fourth feature information of the plurality of video frames of the preselected videos; and
   determine the target video in the preselected videos according to first correlation scores and the second correlation scores.

18. The electronic device according to claim 17, wherein the processor is further configured to:
   map fourth feature information of a plurality of video frames of a target preselected video and the first feature information of the one or more sentences of the query text paragraph to a vector space of a same dimension, to obtain fourth feature vectors of the plurality of video frames of the target preselected video and first feature vectors of the one or more sentences of the query text paragraph, respectively, wherein the target preselected video is any one of the preselected videos;
   determine, from the fourth feature vectors, target feature vectors whose cosine similarities to a first feature vector of a target sentence are greater than or equal to a similarity threshold, wherein the target sentence is any one of the one or more sentences;
   aggregate video frames corresponding to the target feature vectors into a video clip corresponding to the target sentence;
   determine a fifth feature vector of the video clip corresponding to the target sentence according to the target feature vectors; and
   determine a second correlation score between the query text paragraph and the target preselected video according to fifth feature vectors of video clips respectively corresponding to the one or more sentences and the first feature vectors of the one or more sentences.

19. The electronic device according to claim 17, wherein the processor is further configured to:
   determine products of the first correlation scores and the second correlation scores as third correlation scores; and
   determine the target video in the preselected videos according to the third correlation scores.

20. The electronic device according to claim 11, wherein the processor is further configured to:
   perform feature extraction processing on a plurality of video frames of a second video respectively to obtain fourth feature information of the plurality of video frames of the second video, wherein the second video is any one of the plurality of videos; and
   determine third feature information of the second video according to the fourth feature information of the plurality of video frames of the second video.

* * * * *